United States Patent [19]
Schwartz

[11] Patent Number: 6,167,414
[45] Date of Patent: Dec. 26, 2000

[54] SYSTEM FOR ADJUSTING SIZE AND SCALE OF DIGITAL FILTERS AND CREATING DIGITAL FILTERS

[75] Inventor: Michael S. Schwartz, Belmont, Mass.

[73] Assignee: Eastman Kodak Company, Rochester, N.Y.

[21] Appl. No.: 09/095,990

[22] Filed: Jun. 11, 1998

[51] Int. Cl.[7] .................................................. G06F 17/10
[52] U.S. Cl. ............................................................ 708/300
[58] Field of Search .................................. 708/300, 303, 708/313, 315

[56] References Cited

U.S. PATENT DOCUMENTS

| | | | |
|---|---|---|---|
| 5,351,205 | 9/1994 | Hoos | 708/300 |
| 5,355,328 | 10/1994 | Arbeiter et al. | 708/313 |
| 5,483,474 | 1/1996 | Arbeiter et al. | 708/300 |
| 5,579,243 | 11/1996 | Levine | 708/300 |
| 5,995,989 | 11/1999 | Gedcke et al. | 708/300 |

Primary Examiner—David H. Malzahn
Attorney, Agent, or Firm—Peyton C. Watkins

[57] ABSTRACT

The invention provides a technique of scaling a digital filter and of adjusting the width of a digital filter. The technique involves truncating a filter, attenuating its new endpoints and then adjusting the truncated filter by mixing in linear combinations of a set of basis vectors in a way which preserves the linearly defined properties of the original filter. A filter can also be created by defining a spectrum of the filter using a large number of points, performing a Fourier transform on the filter spectrum creating a spatial filter, and reducing a size of the spatial filter by truncating the spatial filter producing a truncated filter and combining the truncated filter with a set of basis vectors.

16 Claims, 11 Drawing Sheets

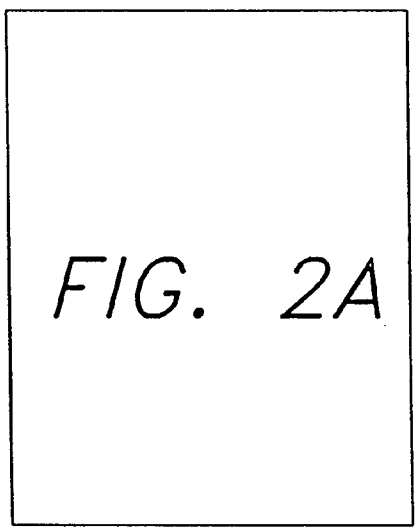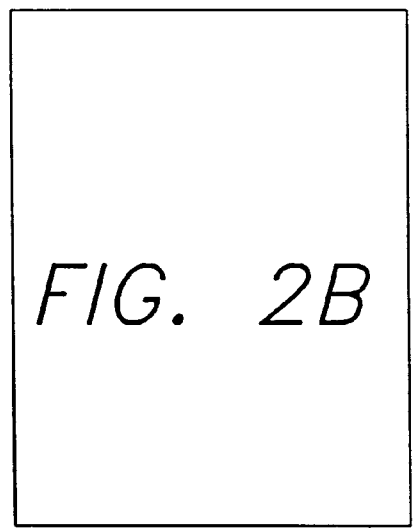
FIG. 2

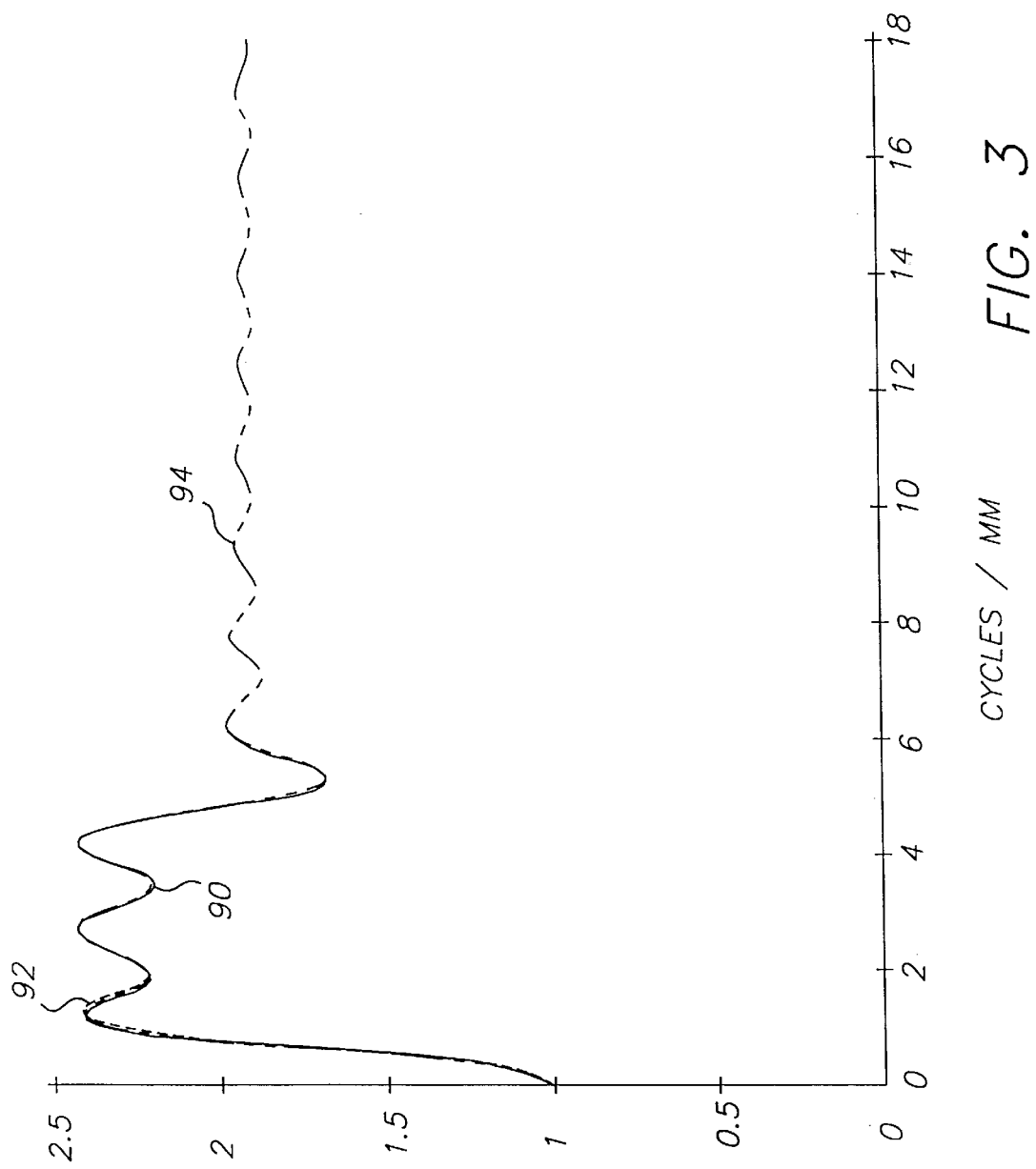

SYSTEM FOR ADJUSTING SIZE AND SCALE OF DIGITAL FILTERS AND CREATING DIGITAL FILTERS

BACKGROUND OF THE INVENTION

1. Field of the Invention

The present invention is directed to the field of image reproduction, and in particular to processes which sharpen, scale, or rotate digital images. More specifically, the invention relates to a method of adjusting the width and spatial resolution of convolution kernels which are used as part of the operation of sharpening or resampling digital images. The invention also relates to creating digital filters by defining a spectrum of the desired filter using a large number of sample points, performing a Fourier transform on the filter spectrum creating a spatial filter and adjusting or reducing the size of the spatial filter.

2. Description of the Related Art

This invention has to do with the field of image reproduction in general and, in particular with processes which use digital methods to sharpen pictures and to scale or rotate pictures. Digital pictures are generally sharpened by convolving their pixel values with a digital sharpening filter. The sharpening filters used for this process can come from a number of sources, but at the time they are actually applied to a picture the sharpening filters have generally been put into the form of an array of values.

One common use of digital sharpening filters is to allow a user to select a sharpening filter which produces a pleasing amount of sharpening for a picture. Applications which perform this operation typically present the operator with a control panel which can be used to set parameter values which are then used to define a sharpening filter. Once the user has selected a set of filtering parameters, the applications create the desired filter and apply it to a copy of the picture on the monitor. To make the operation interactive, the monitor copy is usually much smaller than the full picture. Once the filter has been selected, it is then applied to the entire picture.

One problem which this method of operation entails is that the sharpness which the user sees on the color monitor is usually not the same as the sharpness which comes out on a final print. There are a number of reasons for this discrepancy. For one thing the spatial sampling is often different between the monitor image and the output picture. It is not valid to take the same digital filter and apply it to pictures having varying sample spacings. A second problem is that different devices have different spatial frequency responses. The spatial frequency response of a device is given by its Modulation Transfer Function (MTF), which is equal to the Fourier transform of the result of imaging a single pixel with the device. To appear or look the same, the monitor image needs to be corrected for the difference between the monitor and output MTF. A related problem is that sometimes a user wishes to print the same picture on many different output devices. In that case it is necessary to adjust the sharpening filter in such a way as to allow for different output MTF's and different output sampling rates. The standard way of compensating for different output MTF's is to invert the output or monitor MTF to produce an MTF Compensation (MTFC) filter. There are many standard techniques for performing this inversion. The MTFC filter can then be convolved with the enhancement filter to produce a compensated enhancement filter.

It is also beneficial to be able to use input MTF as a basis for computing a sharpening filter. One way to do this is to produce an MTFC filter for the scanner. The scanner MTFC filter can then be convolved with an enhancement filter chosen by the user to produce a net enhancement filter.

To have a practical system, it is not enough to be able to rescale filters or to convolve filters together. Both operations can make a filtering kernel grow arbitrarily wide. Because of time constraints, there is a limit to how wide a sharpening filter can be. Therefore, a practical system which manages sharpness must have a way to reduce the width of sharpening filters.

Current methods for scaling sharpening filters or adjusting their widths have certain practical defects. One method is to define a filter using an equation which is then used to populate a filtering array right before applying it to a picture. However, using an equation to populate a filtering kernel will distort the filter if the equation predicts non-zero values beyond the extent of the kernel array. Furthermore, an equation for specifying the enhancement or MTFC filter might not be available to the system at the point where the scaling and width adjustment need to take place. Another common method for computing a filter involves specifying various filter properties in Fourier space such as cutoff frequency and pass-band gain and adjusting the filter values until the properties are satisfied. Examples of these are the Parks-McClellan algorithm used by MATLAB. It would be possible to resize a filter by taking its Fourier transform, computing the properties of the transform, and then using those properties to compute a new filter of the desired width. Algorithms of this sort, however, are too complex and therefore too slow to allow a system to perform the required operations as part of an interactive loop.

For these reasons there is a need for a system which can scale digital filters and which can rapidly adjust their width or the number of entries in the filter matrix.

SUMMARY OF THE INVENTION

It is an object of the present invention to allow the operator of an image processing system to be better able to control the amount of sharpening applied to an image.

It is another object of the present invention to adjust the convolution kernels of a digital filter.

It is an additional object of the present invention to allow the operator to see an image on a monitor with a sharpness equivalent to that of the final print.

It is also an object of the present invention to allow a user to select a sharpening filter by observing the effect of the filter on a low-resolution image and have an equivalent filter applied to the full picture at a later time.

It is a further object of the present invention to provide a system that maintains system performance allowing interactive filter selection and modification.

It is an object of the present invention to provide an easy technique of designing and creating filters.

The above objects can be attained by a system that allows the operator of an image processing system to be better able to control the amount of sharpening applied to an image. The system makes it easier to preview a chosen sharpening filter on a monitor and by making it easier to combine an input and/or output MTF with a user-defined sharpening filter. The invention also allows a user to create a sharpening filter using a low-resolution version of a picture, and have an equivalent filter applied to the high resolution version of the picture at a later time. The invention achieves these objects by providing a fast technique of scaling a digital filter and of adjusting the width of a digital filter. The technique involves truncating a filter and then adjusting the truncated filter by mixing in linear combinations of a set of basis filters in a way which preserves the linearly defined properties of the original filter. A filter also can be created by defining a spectrum of the filter, producing a digital version of the filter having a large number of sample points and performing a Fourier transform on the filter spectrum creating a spatial filter. The size of the spatial filter can be reduced to the desired size.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 shows the Fourier transform of a sharpening filter which has been scaled by factors of ⅓ and 3.

DESCRIPTION OF THE PREFERRED EMBODIMENTS

The present invention allows the user of a digital image processing system to be able to see the effect of a digital filter on a monitor and know that a picture printed with that filter will have the same amount of sharpness. It further allows a user to select a sharpening filter by observing its effect on a low-resolution image and have an equivalent filter applied to the full picture at a later time. It does this in a way which does not compromise the performance of the system.

Figure 1:
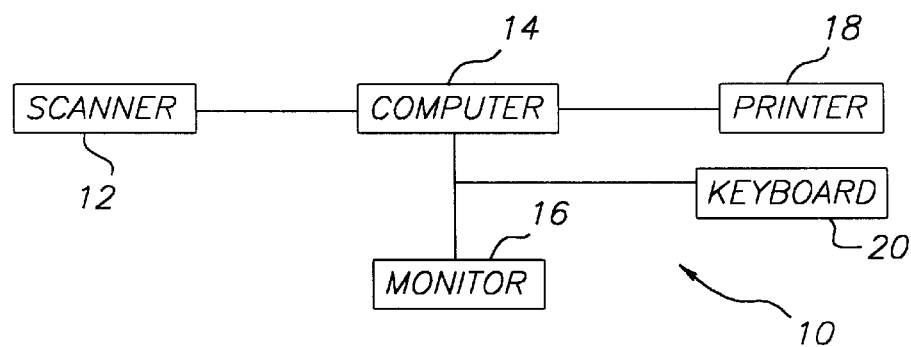
FIG. 1 illustrates the hardware components of a system according to the present invention.

A typical color image processing system 10 according to the present invention, as illustrated by FIG. 1, includes a scanner 12, or other input device such as a CD ROM, which provides an input image to a computer 14, such as a conventional desk top type personal computer. The input image is displayed on a conventional monitor 16 and the user through an interface such as a keyboard 20 or mouse (not shown) selects a digital sharpening filter to apply to the input image. The interface can also be used to specify the spectrum of a filter during filter design or creation. The sharpening filter is applied to the image and displayed on the monitor 16, allowing the user to assess the appropriateness of the filter. If a different sharpness effect is desired, the user can change the parameters of the filter or select a different filter. Once the desired image is obtained, it is output to a printer 18 or other suitable output device.

The computer 14 also includes appropriate storage, such as RAM, ROM, hard disk, floppy disk, optical disk, etc., suitable for storing the processes of the present invention on a computer readable storage medium and distribution as computer program products to customers. The processes can also be distributed to customers over a network, such as the Internet.

Figure 2A:
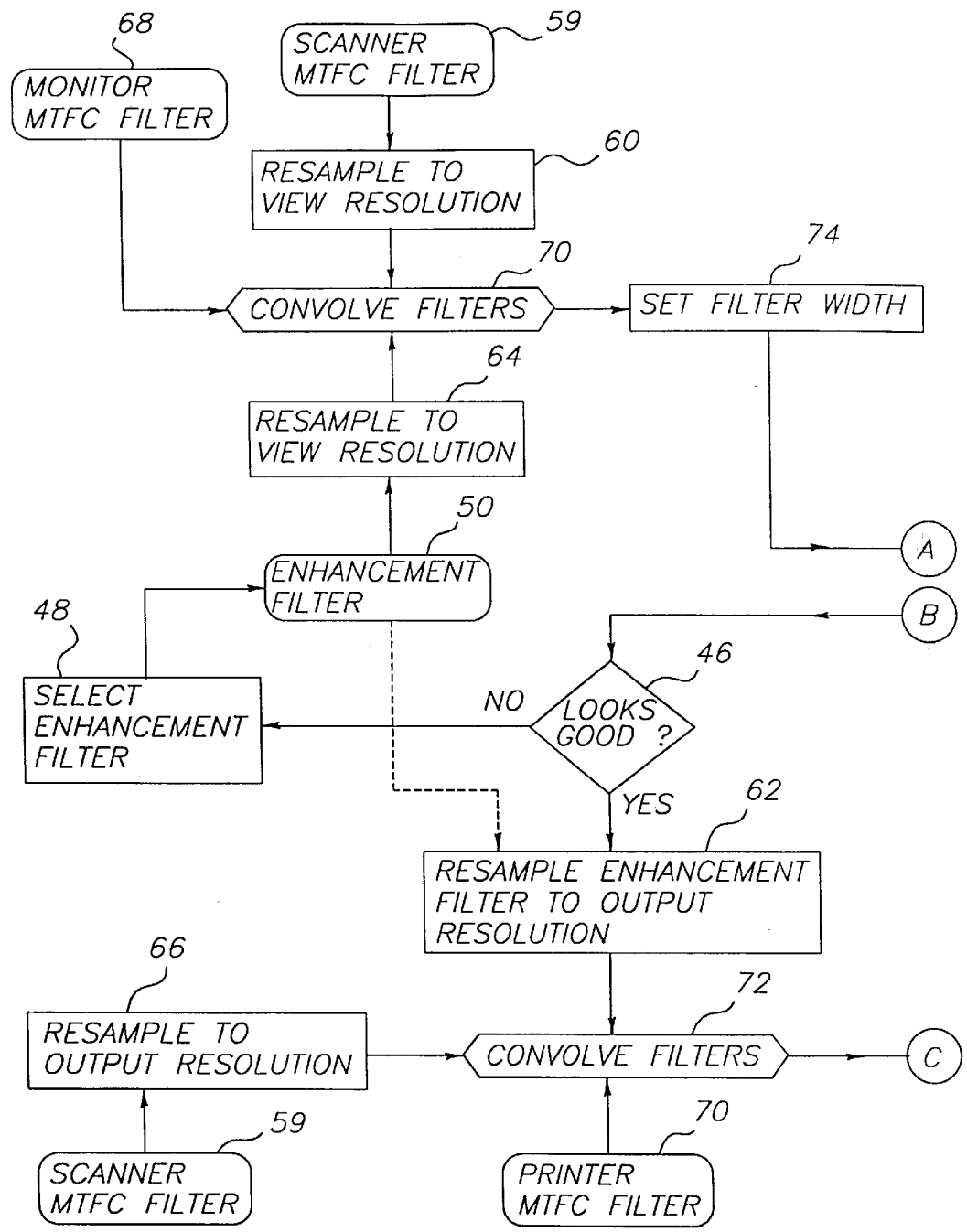
FIG. 2 shows the processing steps for a system which enhances sharpness of pictures.
Figure 2B:
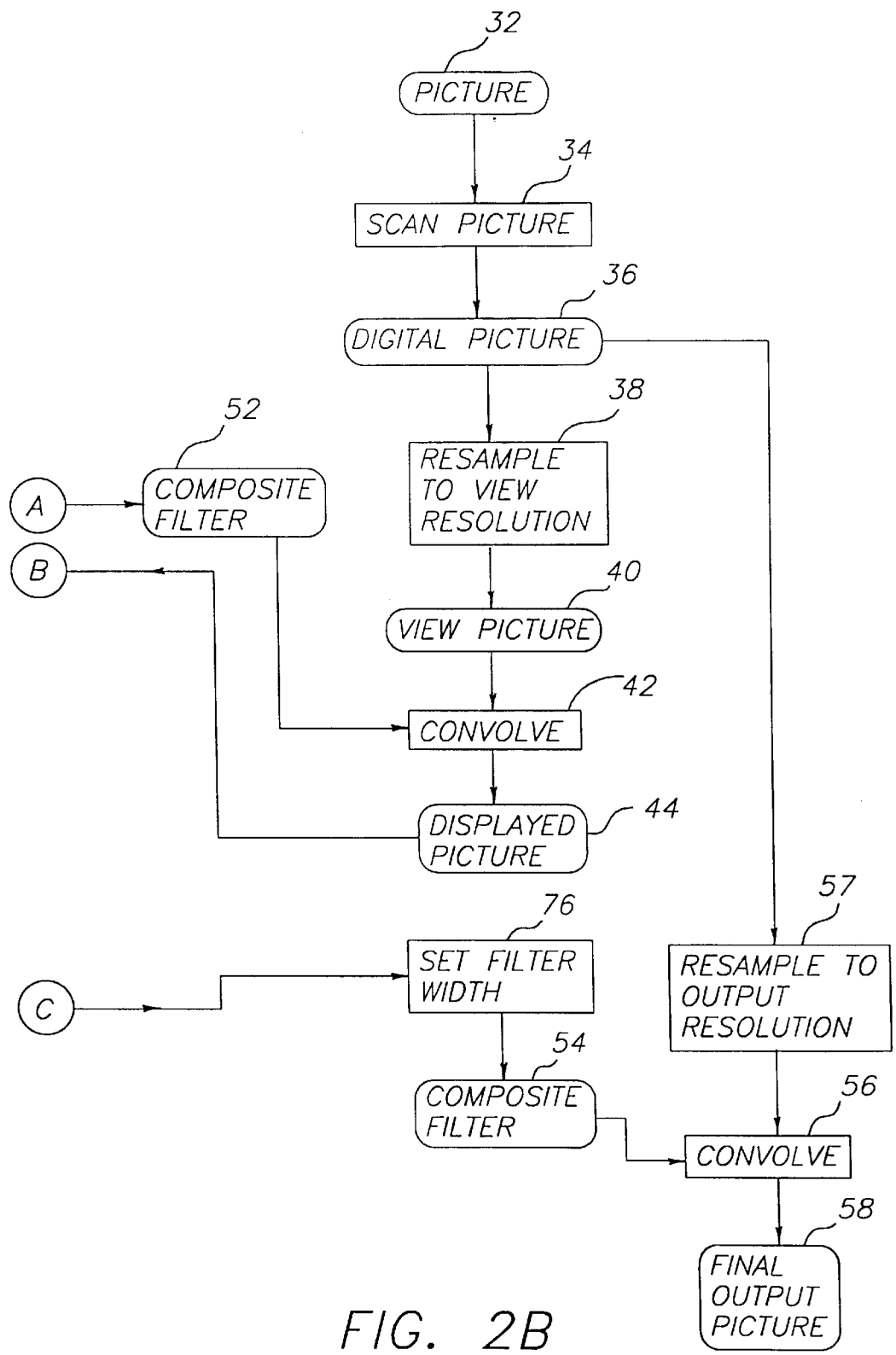

During the process briefly described above, the processing steps depicted in FIG. 2 are performed by the computer 14. FIG. 2 shows the processing steps for a system which adjusts image sharpness. A picture 32 is first scanned 34 into the system. Once the picture has been put into digital form as a digital picture 36 it is displayed on a monitor. To allow the user to see the full picture, it is resampled 38 to create a lower-resolution view picture 40, which is small enough to fit onto the monitor 16. In some cases, the view picture 40 might be sent over a wide area network to a remote user who would select the sharpness enhancement filter. The view picture is then convolved 42 with the filter after the filter is compensated for the input and monitor MTF's and displayed 44 on the user's monitor. At this point, the user can examine the picture and determine 46 if it is acceptable. If the sharpness of the picture does not look right, the user can select 48 an enhancement filter 50 by adjusting various parameters, such as by making adjustments on a graphical user interface control panel through slides, etc. The system then creates 52 a composite filter which combines the user-selected enhancement filter with the MTFC filters, applies that filter to the view picture and displays the result. The user can then examine the result and continue to adjust the enhancement filter until satisfied. At that point the system can produce 54 a composite filter suitable for convolving 56 with the resampled 57 digital picture 36 and printing as the final output picture 58. This final step could take place within the user's application. It could also be done by a different application running at the site where the original high-resolution picture data was located.

For both the user selection loop (see step 52) and the final output path (see step 54), the creation (52/54) of the composite filter requires the same sub-steps. The filters are resampled to the proper resolution, in the case of the enhancement loop the enhancement filter 50 is resampled 64 to the view resolution and in the case of the output path the filter 50 is resampled 62 to the output resolution. Next, the device filters (in this case the scanner filter 59) used are resampled (see 60 and 66) to the proper resolution. Then, the filters are conventionally convolved together. In the case of the enhancement loop the monitor filter 68 is convolved 70 with the scanner filter 59 and in the output path the scanner filter 59 is convolved 72 with the printer filter 70. Finally, the size of the resulting composite is adjusted (see 74 and 76).

The resealing or resampling steps make sure that each filter has the appropriate sample spacing. Because the filters are all in digital form, the resealing or resampling needs to make use of digital resampling methods. One known method of resampling digital data is to compute the new value at each point by applying a digital resampling filter to the old data. For a system which is using this same method for scaling or rotating pictures, it is particularly convenient to be able to use the same method for scaling sharpening filters. One problem in using this method for sharpening filters is that decreasing the sample spacing introduces new high frequencies which were not defined in the original digital filter. A properly defined resampling filter will send or force the value at those new frequencies to 0. This is reasonable behavior when resampling a picture, but is not the right thing to do when resampling an enhancement filter. For a sharpening filter it is preferred to extend (or add back) the older high frequency out into the range of the new frequencies. This will be described in more detail with respect to FIG. 4.

FIG. 3 shows the Fourier transform of a sharpening filter before and after it was rescaled by the present invention. The light solid line 90 shows the transform of the original filter; the heavy solid line 92 shows the transform of the filter after it has been scaled by a factor of ⅓ according to the invention; and the dotted line 94 shows the transform of the filter after it has been scaled by a factor of 3 according to the present invention.

Figure 4:
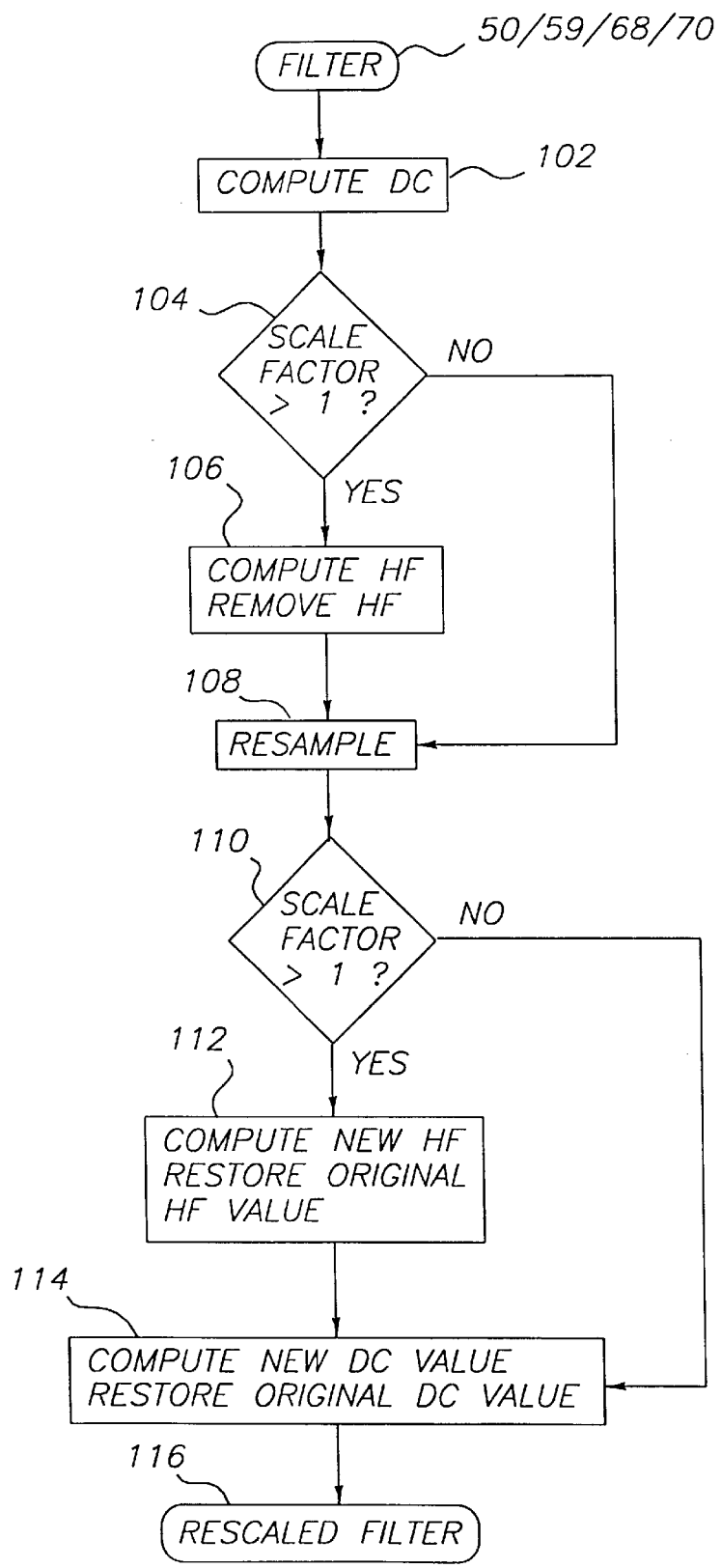
FIG. 4 shows the steps for scaling a sharpening filter.

FIG. 4 shows the steps in scaling or resampling the filter (38, 57, 60, 64 or 66). First, the DC components of the filter are computed 102. If the scale factor is determined 104 to be greater than 1, the invention computes and removes 106 the highest frequency component of the filter. For all scale factors, the filter is resampled 108 using a digital resampling filter. At this point the adjusted filter has a high-frequency component of 0. After the adjusted filter is resampled, it still has a high-frequency component which is nearly 0, because the resampling filter is designed to suppress all frequencies above the original Nyquist frequency. If the scale factor is determined 110 to be greater than 1, the invention computes 112 a new high frequency component and restores the high. frequency component to the filter using the newly computed value. Then, a new DC value is computed 12 and restored to the filter producing the rescaled filter 116.

The step (106) of computing the high-frequency component is done by combining the filter with an analyzing function:

$$\text{HFVector} = \text{sawtooth} * \text{ramp}_{HF} \quad (1)$$

$$HF = \sum_i filter(i) * HFvector(i) \quad (2)$$

The sawtooth function is a conventional function that alternates between 1 and −1, and has the value 1 at its center. The $\text{ramp}_{HF}$ function is a ramp function that starts at (1+1/center)/2, rises linearly to 1 at its center, and falls linearly back to its starting value. The reason for multiplying the sawtooth function by a ramp function is to cause the value HF to include contributions from near the Nyquist frequency. Taking out or removing the high frequency component of step 106 is done by subtracting HF from the center point of the filter. Similarly, putting back or restoring the original high-frequency component of step 112 is done by adding the difference between the old and resampled high frequency values to the center point of the resampled filter.

The final step (114) of the resealing process is to restore the original DC value to the filter. This step takes place for all scale factors. The adjustment is made by adding in a small amount of a normalized ramp function:

$$\text{finalFilter} = \text{adjustedFilter} + \text{DCError} * \text{ramp}, \quad (3)$$

where DCError is the difference between the DC value for the original filter and the DC value of the scaled filter. The ramp function is a ramp function that starts at 0, proceeds linearly to a maximum value at its center and then falls linearly back to 0. It is normalized so that its DC value is 1.

After all filters have been rescaled, they can be combined into a composite filter. The step of combining the filters together is just a conventional convolution:

$$\text{CompositeFilter} = \text{MonitorMTF} \otimes \text{enhancementFilter} \otimes \text{ScannerMTFC} \quad (4)$$

Figure 5:
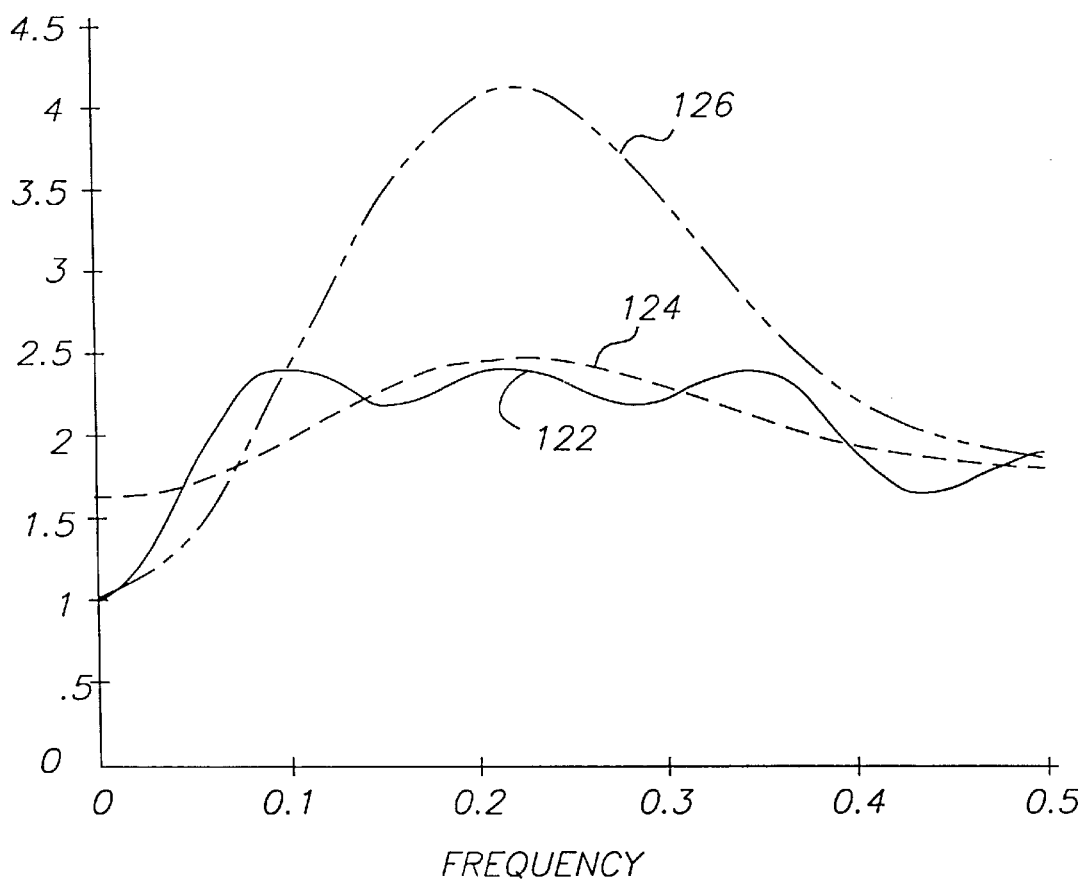
FIG. 5 shows the Fourier transform of a 15-point sharpening filter, and the spectra of two 7-point filters made from the 15-point filter.

The final step in producing a final composite filter is to reduce its width (see 74 and 76) to a value which is appropriate to system requirements. Reducing the size of a sharpening filter takes a certain amount of care. FIG. 5 shows what can happen if a filter is simply truncated. The solid line 122 shows the Fourier transform of an original 15-point sharpening filter. The dashed line 124 shows the transform of a 7-point filter which consists of the central 7 points of the original filter. The spectrum of transformed filter 124 looks like a blurred version of the spectrum of the original filter 122. This is not surprising; truncating in the spatial domain is equivalent to convolving with a sinc function in the frequency domain. Note also that the low frequencies have generally been greatly diminished; this is consistent with the fact that the reach of the filter is smaller. The dash-dot line 126 shows the filter adjusted according to the current invention. This filter mostly preserves the low frequency properties of the original filter. Although the two filters are not identical (which is, in any case, impossible) pictures created with both filters show good visual agreement.

Figure 6:
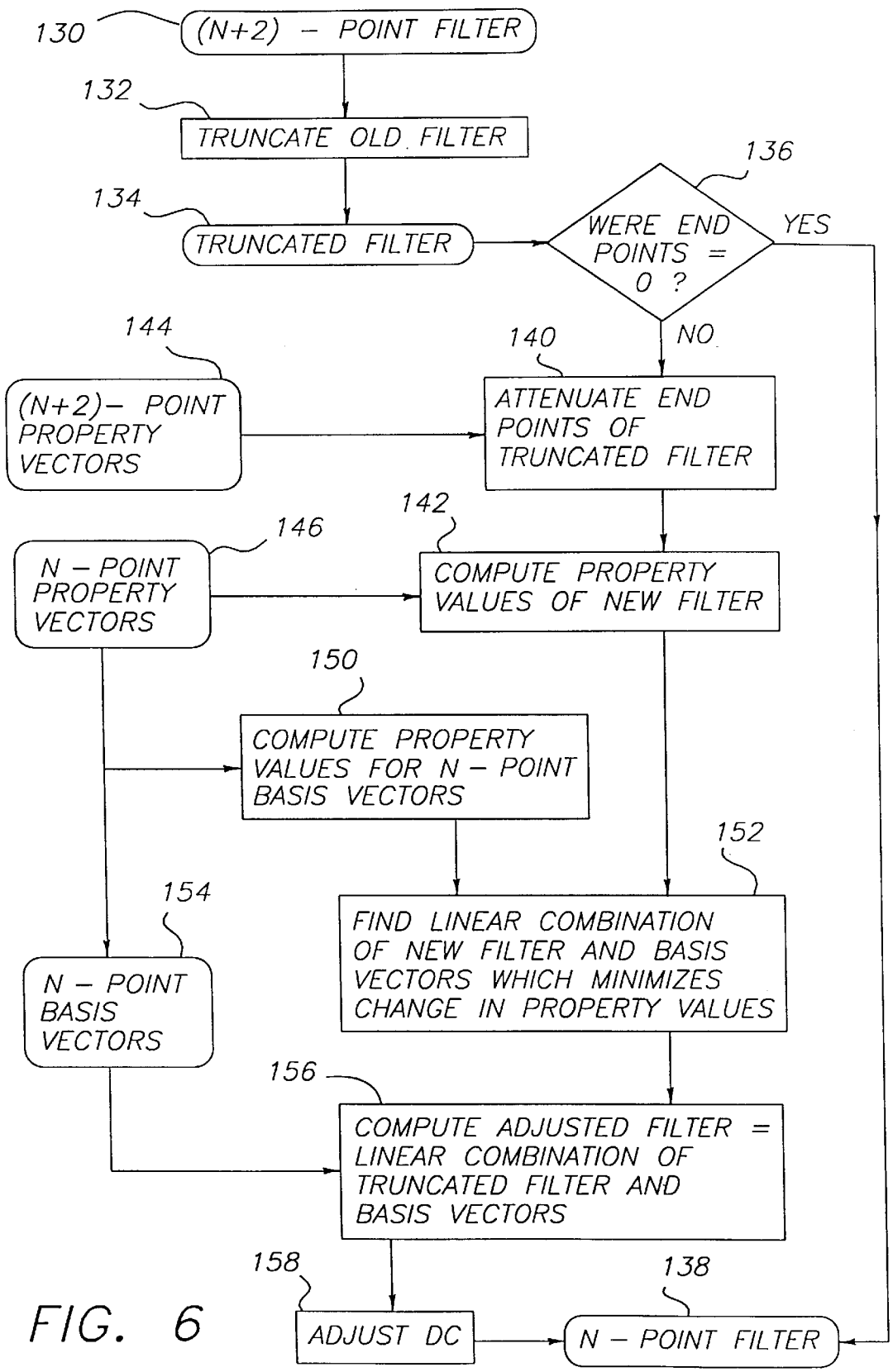
FIG. 6 shows the steps for adjusting the size of a sharpening filter.

The process of reducing the size of a sharpening filter comprises iteratively interactively reducing the filter size by 2 until the desired size is reached. FIG. 6 shows the steps in reducing the size of a (N+2)-point sharpening kernel or filter 130 by two points. The first step is to truncate 132 the filter by removing the two end points producing a truncated filter 134. Next, a determination is made 136 as to whether the old end points were 0, if so, this is enough and the n-point filter 138 is produced. Otherwise, the new filter must be adjusted. The first adjustment is to preferably but optionally attenuate 140 the end points of the new filter. This is done to help keep the new filter smooth and well-behaved. The new endpoints are multiplied by the attenuation factor:

$$attenFactor = 1 - \frac{|oldFilter(1)|}{\sum_{i=1}^{center-1} |oldFilter(i)|} \quad (5)$$

In the case where the end-point of the old filter is 0, the attenuation factor will be 1.

The next set of operations involve readjusting the shortened filter by mixing in a set of basis vectors as defined in the equation below.

$$adjustedFilter = \quad (6)$$

$$(1 + coef_0) * attenuatedFilter + \sum_{b=1}^{NBasis} coef_b * basisVector_b$$

The choice of the basis vectors will be discussed in more detail below. The important thing about them is that there are enough of them to allow for some flexibility in how the filter is adjusted.

However, before performing the mixing, the property values of the old or original filter need to be computed 142 from a set 144 of property vectors.

The coefficients are chosen or determined, as discussed in detail below, so that the new filter comes as close as possible to preserving various properties. The properties are defined by a set of property vectors 146 which are used to compute 148 the property values for the new filter. The property vectors 146 are also used to compute 150 the property values for the basis vectors which will be mixed in.

$$Property_p = \sum_i filter(i) * PropertyVector_p(i) \quad (7)$$

The property vectors correspond to various meaningful properties of the filter, such as the DC value of the filter and the value at the Nyquist frequency. They will be discussed in more detail below. Because the computation of the properties is linear, the property values of the adjusted filter can be expressed as a linear combination of the coefficients:

$$adjustedProperty_p = attenuatedProperty_p + \sum_{b=0}^{NBasis} M_{P,b} * coef_b, \quad (8)$$

where the matrix M is defined by property values of the basis vectors and by the property values of the attenuated filter:

$$attenuatedProperty_p = \sum_i attenuatedFilter(i) * propertyVector_p(i) \quad (9)$$

$$M_{p,b} = \begin{cases} attenuatedProperty_p & \text{for } b = 0 \\ \sum_i basis_b(i) * propertyVector_p(i) & \text{for } b > 0 \end{cases}$$

The coefficient values are chosen or calculated 152 to minimize the error function, subject to a constraint:

$$error = \sum_p weight_p * \frac{(oldProperty_p - adjustedProperty_p)^2}{\Delta + oldProperty_p^2} + \sum_{b=0}^{NBasis} C_b * coef_b^2 \quad (10)$$

The purpose of the constraint is to keep the coefficients small, so that the adjusted filter is almost the same as the attenuated filter. The constraint coefficients as adjusted are computed by $C_b=(1+b)^2$. This causes the coefficients for the later basis functions to be constrained more than those of the earlier basis functions. The weight values are adjusted to give the more important properties more weight. The normalization by the square of the old property value is intended to allow for the fact that the different properties have different scales. The constant $\Delta$ is set to 0.01. Because the error function is a quadratic function of the coefficients, it can be minimized using standard linear regression techniques:

$$coef_b = \sum_{b'} (A^{-1})_{b,b'} * Y_{b'} \quad (11)$$

where $$A_{b,b'} = \begin{cases} \sum_p \left( \frac{weight_p}{\Delta + oldProperty_p^2} * M_{b,p} * M_{b',p} \right) & \text{for } b \neq b' \\ \sum_p \left( \frac{weight_p}{\Delta + oldProperty_p^2} * M_{b,p} * M_{b',p} \right) + C_b & \text{for } b = b' \end{cases} \quad (12)$$

$$\left( \frac{weight_p}{\Delta + oldProperty_p^2} * M_{b,p} * (oldProperty_p - adjustedProperty) \right)$$

For an N point filter there are 1+(N+1)/2 basis vectors 154. In the preferred implementation they are defined as follows:

$$basis_1 = spike \quad (13)$$

$$basis_2 = ramp$$

$$basis_{2+n}(i) = \begin{cases} 1/2 & \text{for } i = center \\ -1/4 & \text{for } i = center \pm n \\ 0 & \text{otherwise} \end{cases}$$

Figure 7:
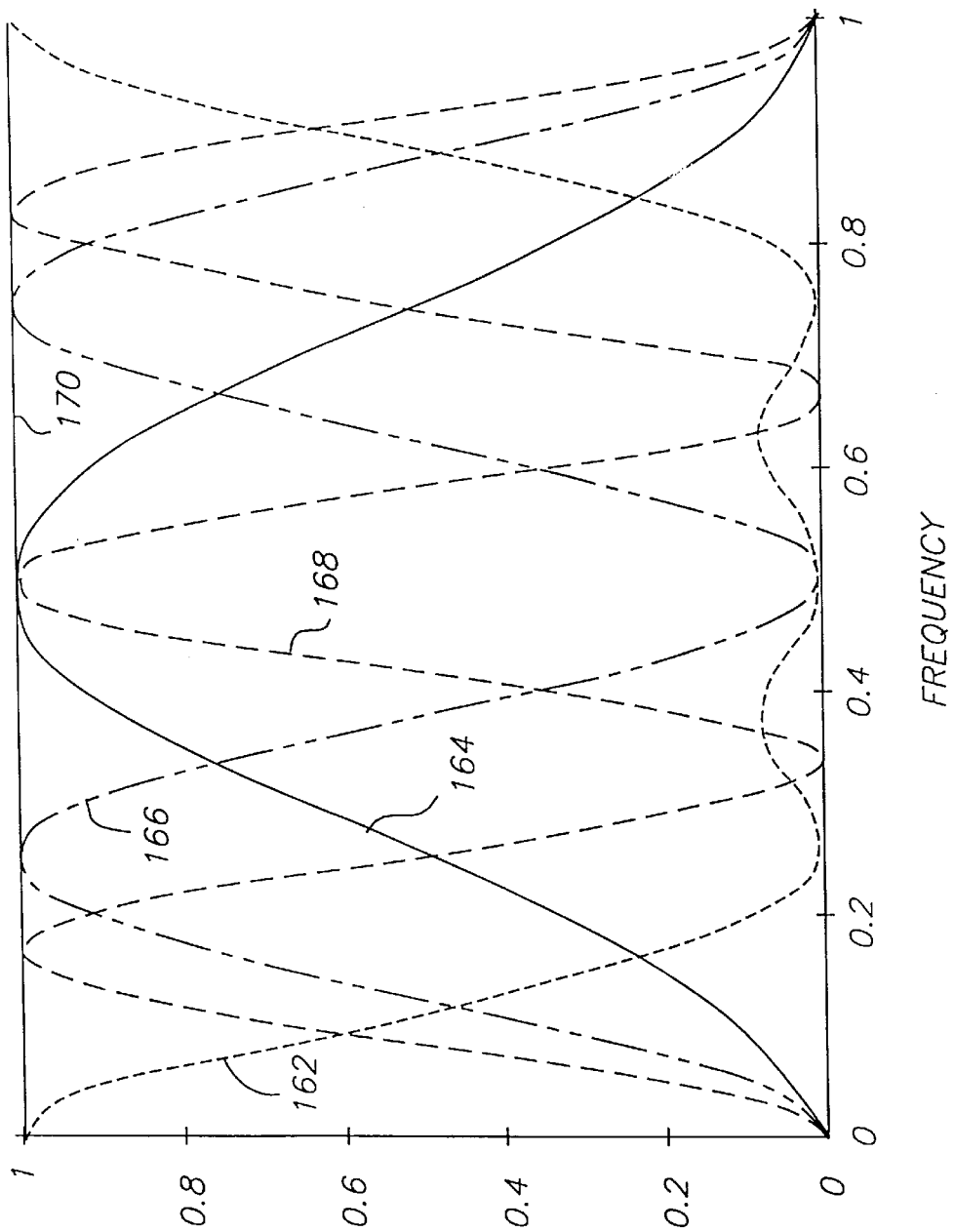
FIG. 7 shows the Fourier transforms of a set of basis vectors used in reducing the size of a 7-point filter.

FIG. 7 shows the spectra of the four basis vectors 162, 164, 166 and 168 and the DC component 170 used for N=7.

The basis vectors are used to compute 156 (see FIG. 6) an adjusted filter as a linear combination of the truncated filter and the basis vectors.

The property vectors 144 correspond to filter properties which it is important to try to preserve as the filter size changes. Each property is associated with a particular weight which corresponds to that property's relative importance.

In the preferred implementation the properties are:

| | |
|---|---|
| DC | propertyVector$_1$(i) = 1 |
| Curvature at DC | propertyVector$_2$(i) =ramp(i)*(i-center)$^2$ |
| High Frequency | propertyVector$_3$(i) = ramp* sawtooth |
| $\Sigma$ frequencies | propertyVector$_4$(i) = spike |

The ramp function is again conventionally defined as a ramp which starts at 1/center, rises linearly to 1 at its center, and then falls back linearly to 1/center. The sawtooth function alternates between 1 and −1. It is 1 at its center. The spike function is 0 everywhere except at the center, where it is 1.

There is an additional step in computing the property vectors. For each stage of the truncation process, the property vectors for that stage are mixed in with the center N points of the property vectors for the previous stage:

$$propertyVector_i^{(Npoints)} \rightarrow \quad (14)$$

$$\frac{propertyVector_i^{(Npoints)} + N * propertyVector_i^{(N+2 points)}}{N+1}$$

The purpose of this mixing is to make the transition from one truncation stage to another less abrupt.

One good set of values for setting the weights are as follows:

| | |
|---|---|
| DC | 1000 |
| Curvature at DC | 80 |
| High Frequency | 50 |
| Σ frequencies | 100 |

For the case where N=5 points, the last two weights are preferably reduced by a factor of 3; for the case where N=3, the last two weights are preferably reduced by a factor of 20.

The final step 158 in the width adjustment is to adjust the shorter filter to retain the DC value of the original filter. Because one of the properties used in making the adjustment is the filter's DC value, and because that property is given a high weight, this final adjustment will be small. The adjustment is made by adding in a small amount of a normalized ramp function:

$$\text{finalFilter} = \text{adjustedFilter} + \text{DCError} * \text{ramp}, \quad (15)$$

where DCError is the difference between the DC value for the original filter and the DC value of the adjusted filter. The ramp function here starts at 0, proceeds linearly to a maximum value at its center and then falls linearly back to 0. It is normalized so that its DC value is 1.

Figure 8:
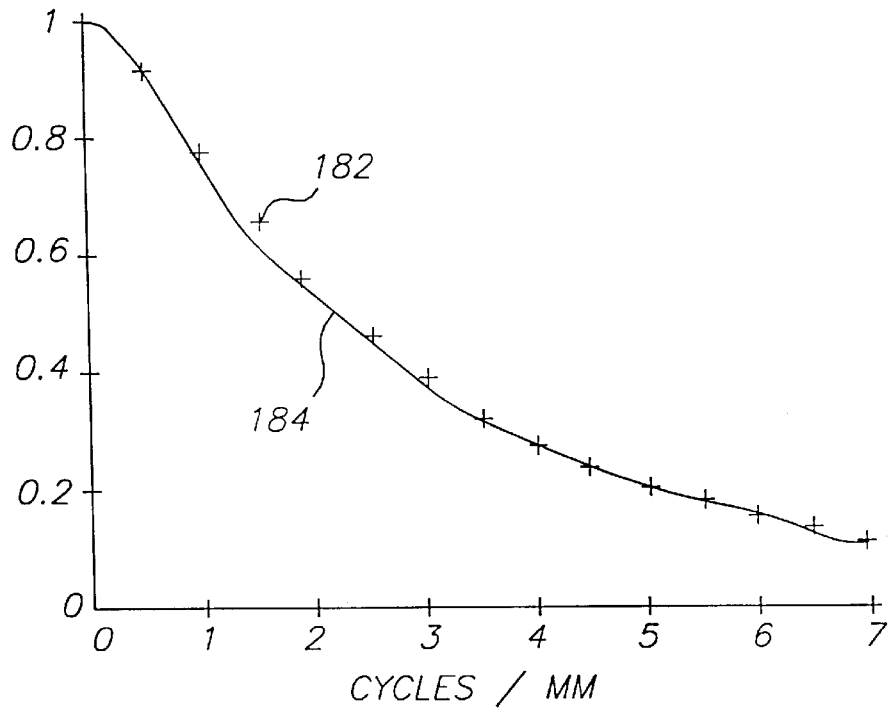
FIG. 8 shows a device modulation transfer function (MTF) for a printer.

An example of MTF compensation using the present invention will now be discussed. FIG. 8 shows a device modulation transfer function (MTF) for an HP scanner, which is a popular desktop scanner. The symbols 182 indicate measured values for the MTF. The solid line 184 shows the Fourier transform of a 15-point wide array which was derived from the measured MTF values as follows:

1. Reflect the measured values around the center point to get a 29-point symmetric function.
2. Take the Fourier transform of the symmetric spectrum to get a 29-point spatial function.
3. Use the method described herein to produce a 15-point wide version of the spatial function.

Figure 9:
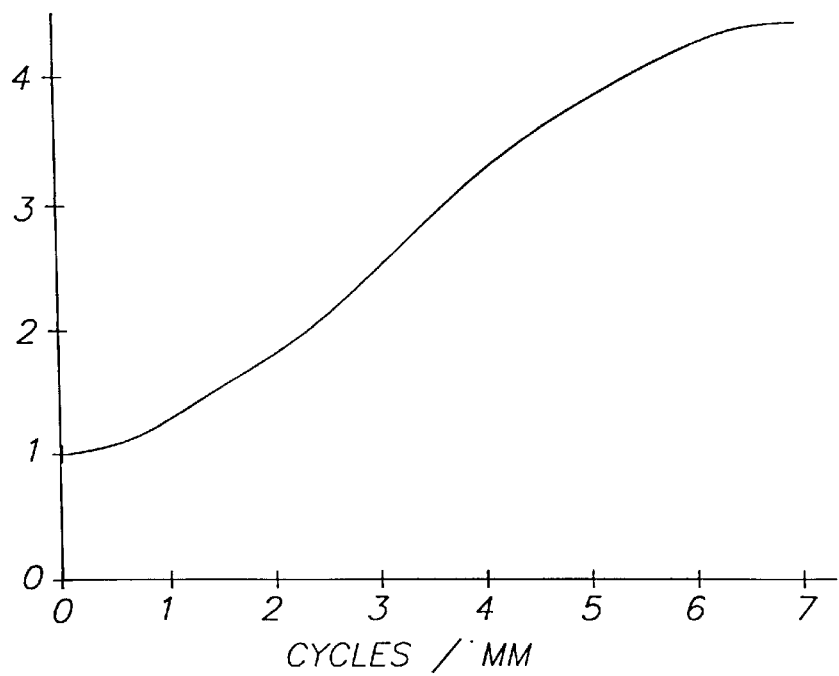
FIG. 9 shows the Fourier transform of a device compensation filter.

FIG. 9 shows the Fourier transform 186 of a device compensation filter derived from the measured MTF data. This filter was derived using the following steps:

1. For each measured value compute an MTF compensation value using the formula:

$$MTFC(f) = (1 + \sigma^2) * \frac{MTF(f)}{MTF(f)^2 + \sigma^2} \quad (16)$$

This function is almost the reciprocal of the MTF function. The constant prevents too much amplification of very low frequency values. In the figure, the value for σ is 0.12.

2. Reflect the MTFC values around the center point to get a 29-point symmetric function.
3. Take the Fourier transform of the symmetric spectrum to get a 29-point spatial function.
4. Use the method described herein to produce a 15-point wide version of the spatial function. This filter is a device compensation filter.

Figure 10:
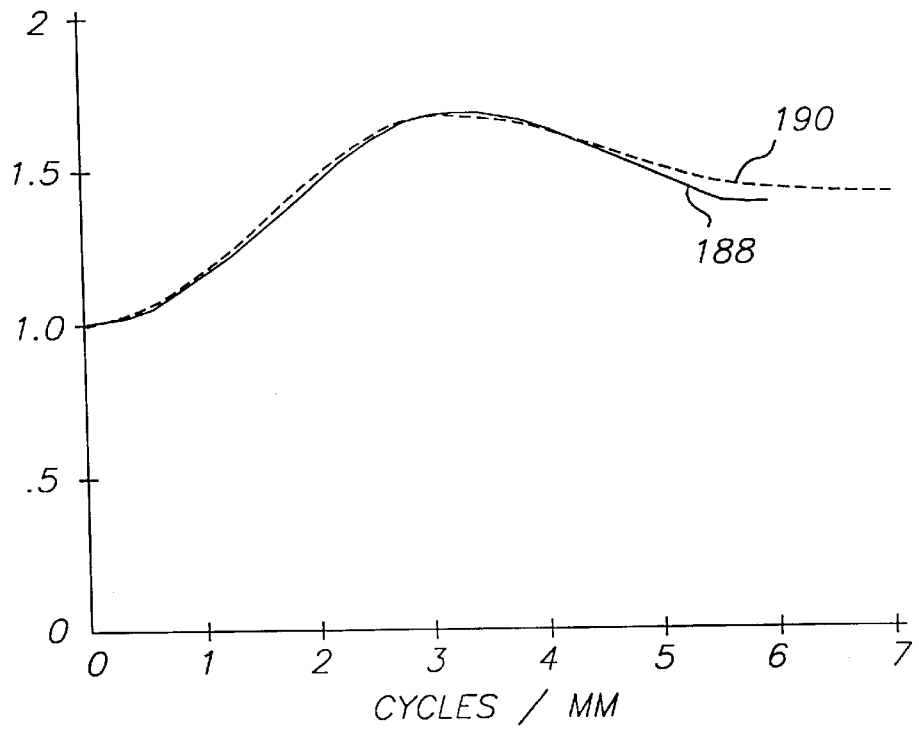
FIG. 10 shows the Fourier transform for a typical sharpening filter.
Figure 11:
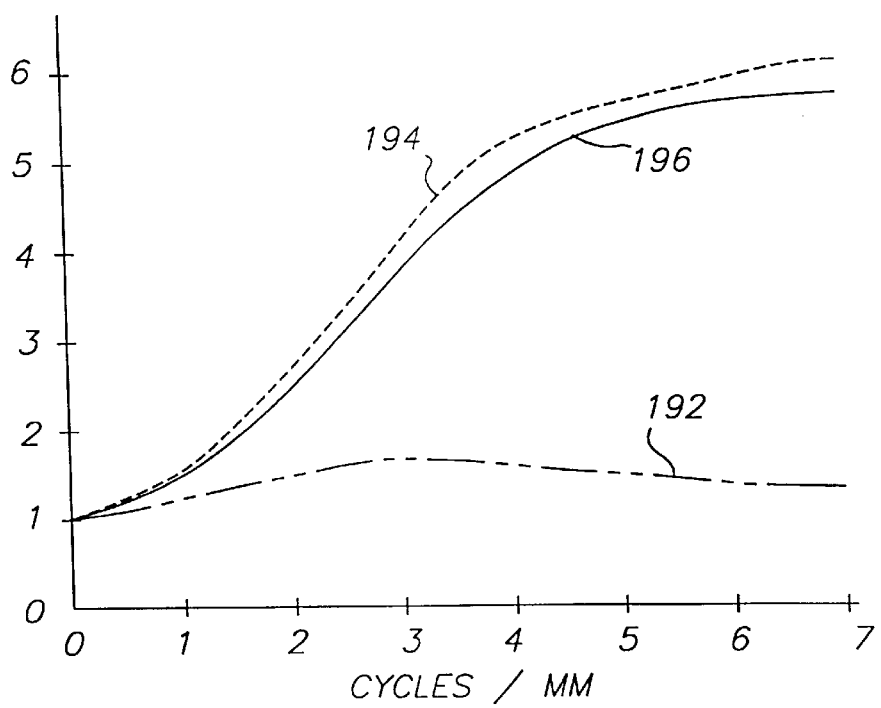
FIG. 11 shows a reduced compensated sharpening filter.

FIG. 10 shows the Fourier transform for a typical sharpening filter. This particular filter was designed for an image resolution of 300 cycles/inch or about 14 Cycles/MM. Curve 188 in FIG. 10 shows this sharpening filter. Curve 190 shows the same sharpening filter after it has been rescaled to the resolution of the input scanner. FIG. 11 shows the Fourier transform of the sharpening filter after the device compensation filter has been applied to it. The original sharpening filter 192 is a 7-point filter. The compensation filter is a 15-point filter so the convolution of the two filters is a 21-point filter 194. FIG. 11 shows the same compensated sharpening filter but as a filter 196 reduced to 7 points using the method described herein.

The present invention can also be applied to scaling or interpolation type filters. To see how the interpolation filters are to be adjusted it is helpful to review the way they are used. An interpolation filter typically resamples a picture by first resampling the rows of a picture, and then resampling the columns. It interpolates a one-dimensional data set as follows. Suppose picture(i) represents a line of data. Suppose $\text{resampleFilter}_{phase}$ represents a set of interpolation filters in which there are nphase filtering kernels, each of which are N points wide and where a good value for nphase is 64. The act of interpolation requires the computation of new picture values for some set of non-integer position values. Let newpicture(x) be the interpolated picture and suppose that x approximately equals i+p/nphase, where i is a integer grid point and p is a non-negative integer less than phase. Then, the new values are calculated as follows:

$$newPicture(i + p/nphase) = \sum_{k=1}^{N} resampleFilter_p(k) * picture(i + k - N/2) \quad (17)$$

One way of understanding this equation is to construct a composite sharpening filter from the interpolation filters:

$$\text{Composite}(i - p/nphase) = \text{resampleFilter}_p(i)/nphase \quad (18)$$

Note that with this definition Composite is defined on the same grid as the original picture. Also the normalization by phase means that if each of the interpolation filters sum to 1, Composite will also sum to 1. With this definition, the new picture is given by:

$$newPicture(i + p/nphase) = \frac{1}{nphase} \sum_{k=1}^{N} Composite(k - p/phase) * picture(i + k - N/2) \quad (19)$$

or, adopting the convention that non-grid values of picture are 0, $$newPicture(x) = \frac{1}{nphase} \sum_{y=0}^{N} Composite(y) * picture(x + y - N/2) \quad (20)$$

With this definition the new picture is equal to the convolution of the old picture with the composite filter, and the Fourier transform of the new picture is equal to the old transform times the transform of the composite filter.

There are various constraints on the resampling filters which derive from these relationships. One important constraint is that the composite filter has to be smooth. If this is violated artifacts can result. Consider, for example, the case where some amount of resealing is performed on a picture before sending it to a half-tone output device. If the scale factor is just right (or just wrong) the value of p can vary at a frequency which is about the same as the half-tone frequency of the output writer. This situation can, in turn, convert even small discontinuities in the composite filter into noticeable beat type artifacts.

A second important constraint involves the symmetry of the filters. Flipping the input picture around any of its grid points should result in an interpolated picture which is also flipped. This consideration leads to the following relationship for p=1,2, . . . nphase−1:

$$\text{resampleFilter}_p(i)=\text{resampleFilter}_{nphase-p}(N+1-i) \tag{21}$$

For the zero-phase filter, the symmetry requirement implies the stricter requirement:

$$\text{resampleFilter}_0(N)=0 \tag{22}$$

$$\text{resampleFilter}_0(i)=\text{resampleFilter}_0(N-i) \text{ for } i\neq N \tag{23}$$

The symmetry requirement means that the last point of the composite filter defined above is always 0, so that the composite filter can be thought of as a symmetric filter having N*nphase−1 points.

The final constraint is on normalization. Both the composite function and the individual resampling kernels must sum to 1.

The process of adjusting a resampling filter can thus be broken down into the following steps:

1. Construct a composite filter.
2. Adjust the scale or width of the composite filter.
3. Re-create the bank of resampling kernels from the composite filter
4. Modify the resulting kernels in order to enforce the constraints Because the composite filter is a type of sharpening filter, the techniques for adjusting the width of sharpening filters could be applied to the composite filter. Unfortunately, the composite filter is a great deal wider than a typical sharpening kernel, so these techniques could be time-consuming. On the other hand, the transform of the composite filter is a good deal simpler than the transform of a typical sharpening filter. It starts at 1 for its DC value, remains at about 1 until it gets near its cut-off frequency, and then goes to 0, where it remains. Therefore, a simpler technique is as described below is possible.

The method described herein reduces the composite filter by 2*nphase points at a time. Thus, it reduces the resulting resampling kernels by 2 points at a time. It takes the points equally off of both ends. After the truncation step it reduces the nphase points at each end of the new, shorter filter so that they go smoothly to 0. It does this by subtracting the end point value multiplied by an attenuation function from each end. This attenuation function preferably has the following properties: 1. It goes from one to zero; 2. It has zero slope at each end; and 3. It has zero curvature where it meets the middle part of the filter. The purpose of the conditions is to make sure the resulting filter stays smooth.

Figure 12:
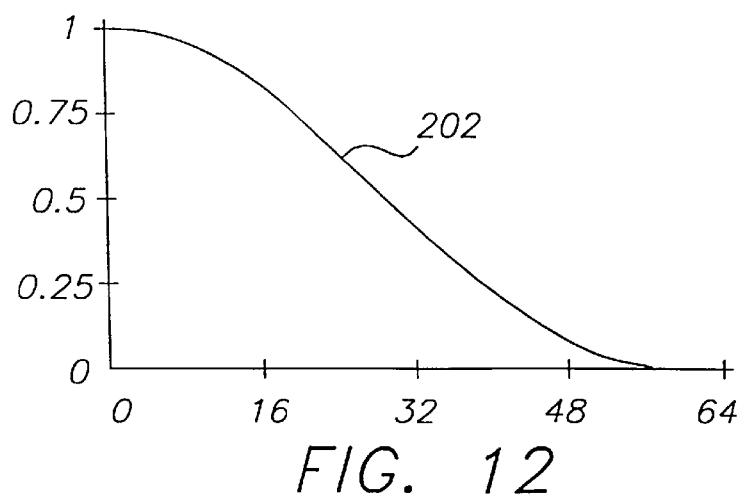
FIG. 12 depicts an attenuation function.

One way to compute an attenuation function 202, as illustrated in FIG. 12, with all three properties is as follows:

$$C(i)=\left(1-\left(\frac{i-1}{nphase-1}\right)^2\right)^3 \tag{24}$$

$$\text{filter}(i) \rightarrow \text{filter}(i)-C(i)*\text{filter}(1) \ (i=1, \ldots \text{nphase}) \tag{25}$$

After the end points of the new composite filter have been attenuated, it is adjusted to sum to 1.0. This is done by subtracting a normalization filter or function from the composite:

$$\text{gap}=\Sigma\text{Composite}-\Sigma\text{newComposite} \tag{26}$$

$$\text{newComposite} \rightarrow \text{newComposite}+\text{gap}*\text{ramp} \tag{27}$$

The ramp function, as in previous uses mentioned herein, starts at 0, goes linearly to a peak value, and then falls back down to 0. It is normalized to sum to 1. The reason for normalizing by addition rather than by division is to modify the composite more at the center than at the ends, a preferable characteristic.

Once the composite has reached its final size, it is broken apart into individual resampling kernels. At that point the individual kernels must be normalized so that each of them sum to 1. This has to be done carefully to avoid creating discontinuities in the composite filter. This can be done as follows:

1. Construct a ramp function of the same size and symmetry as the composite. Normalize the ramp to 1.
2. Break apart the ramp function into a set of normalization functions normp using the same procedure as for creating the individual resampling kernels.
3. Use the function normp to renormalize the individual resampling filters:

$$\text{resampleFilter}_p \rightarrow \text{resampleFilter}_p+(1 \ldots 0-\Sigma\text{resampleFilter}_p)*\text{norm}_p \tag{28}$$

Scaling a resampling filter is similar. The first step is to form the composite and scale it. Since the composite filter is supposed to be zero at the highest frequencies, it is not necessary to take extra steps to preserve its high-frequency behavior. In general, the scaling operation will change the width of the composite filter. Therefore, it may also be necessary to adjust its width.

One reason to want to rescale a resampling filter is as a way of precisely placing the cutoff frequency corresponding to an existing set of interpolation filters. When an interpolation filter is used to reduce the size of a picture, the cutoff frequency should ideally be placed at the scaled Nyquist frequency of the picture. Because this value for the ideal location of the interpolation cutoff frequency depends on the scale factor, it could not be known at the time the interpolation filters were created. For this reason an available set of interpolation filters might not have the ideal cutoff frequency. In other words, it could happen that a set of filters is needed for a scale factor which is slightly different than the scale factors associated with any of the available choices. One way to compute the needed resampling filters is to take a choice which is close to the scale factor desired and scale that interpolation filter by the ratio of the available scale factor to the desired scale factor.

The sharpening filters described up to now have been separable filters. However, it is also possible to apply these techniques to unsharp masking type filters as long as the blurring filter used to compute the unsharp mask is separable. USM-type filters can often be preferable to separable filters because the separable sharpening filters discussed herein before can produce diagonal artifacts if they are used to produce a lot of sharpening. The reason is as follows. The two-dimensional filter produced by applying a one-dimensional filter f to a picture's rows and then columns takes of the form:

$$F_2(x,y)=f(x)*f(y) \tag{29}$$

The Fourier transform of $F_2$ is also equal to the product of the transform of f with itself. On the horizontal or vertical frequency axis this means the transform of $F_2$ is the same as the transform of f, since it is being multiplied by the DC value of f, which is 1. However, for diagonal frequencies the transform of $F_2$ can be huge. In particular, on the 45° line, the transform of $F_2$ is the square of the transform of f, so a modest frequency boost for the one-dimensional filter may not look at all good on a picture.

One way of avoiding this problem is to use filter descriptions of the filter which are inherently two-dimensional. However, applying a fully two-dimensional filter to a picture takes more time. In general, applications are constrained by processing time, so having a faster filtering algorithm generally means that the application can make use of a larger filtering kernel. Thus, using a two-dimensional description will not necessarily lead to better pictures.

An approach to the problem is to use an unsharp masking-type filter. This technique includes applying a separable blurring filter to the picture, and then take a linear combination of the blurred picture with the original picture. In other words $$\text{OutputPicture} = C_0 * f_y \otimes f_x \otimes \text{InputPicture} + C_1 * \text{InputPicture}, \quad (30)$$

where $f_x$ and $f_y$ are one-dimensional filters applied to the columns and rows, and $C_0$ and $C_1$ are constants. This leads to a two-dimensional filter given by:

$$F_2(x,y) = C_0 * f(x) * f(y) + C_1 * \text{spike}_2(x,y), \quad (31)$$

where $\text{spike}_2$ is a function which is 1 at (0,0) and zero everywhere else. In Fourier space the transform of the two-dimensional filter is related to the one-dimensional transforms by:

$$\Im(F_2)(kx,ky) = C_0 * \Im(f)(kx) * (f)(ky) + C_1 \quad (32)$$

where the operator $\Im$ indicates the Fourier transform. If the coefficient values $C_0$ and $C_1$ are chosen or calculated in such a way that the Fourier transform of f is roughly between 0 and 1, the Fourier transform of $F_2$ will stay at a reasonable size.

Given a desired one-dimensional filter, there are an infinite number of choices for the coefficients $C_0$ and $C_1$. One method to use is to choose the coefficients in such a way that the spectrum of the resulting one-dimensional filter is always between 0 and 1. Suppose you start with a one-dimensional filter $f_0$. Then the coefficients can be defined as follows $\Im$: Let $$\text{fmin} = \min(\Im(f_0)) \quad (33)$$

$$\text{fmax} = \max(\Im(f_0)) \quad (34)$$

$$DC = \Sigma f_0 \quad (35)$$

Then, the coefficients can be computed by: if $$if \left( DC \geq \frac{fmin + fmax}{2} \right) \quad (36)$$

$$C_1 = \text{fmin } C_0 = (\text{fmax} - \text{fmin}) \quad (37)$$

else $$C_1 = \text{fmax } C_0 = (\text{fmin} - \text{fmax}) \quad (38)$$

and then compute the one-dimensional filter by:

$$f = (f_0 - C_0 * \text{spike})/c_1 \quad (39)$$

Note that the DC value for the resulting one-dimensional filter f is between ½ and 1. The problem with this method is that it requires a Fourier transform, which can be time-consuming. An alternative is to compute fmin and fmax from the minimum and maximum values of a square-wave transform of $f_0$. A square wave transform is close enough to a cosine transform so that the minimum and maximum values obtained from the square wave transform will be about the same, so that the Fourier transform of f will only be slightly negative and only somewhat greater than 1.

In the case of an anamorphic filter the computation is modified-to allow for the fact that the horizontal and vertical filters are different. One way to do this is by basing fmin and fmax as the minimum and maximum of the transform values for both filters. Doing this means that both the resulting horizontal and vertical filters will have transforms which are between 0 and 1.

To scale a filter which has been put into decomposed form, it is only necessary to scale the one-dimensional filters while leaving the coefficients alone. This is because scaling the spike function leaves it unchanged.

Adjusting the width of a decomposed sharpening filter kernel is dome with the following procedure:

1. Compute the net one-dimensional filters.
2. Adjust the width of those filters.
3. Recompute the decomposition from those.

This is preferable to shortening the decomposed one-dimensional filters because the shortening method does not try to keep the spectrum between 0 and 1.

Composition is more complicated because the composition of two filters in decomposed form will not, in general have that form:

$$\begin{aligned} F_2^{Composite} &= F_A \otimes F_B = \\ &(C_0^A * f_x^A + C_1^A * \text{spike}_2) \otimes (C_0^B * f_x^B * f_y^B + C_1^B * \text{spike}_2) = \\ &(C_0^A * C_0^B) * (f_x^A \otimes * f_x^B) * (f_y^A \otimes f_y^B) + (C_0^A * C_1^B) * (f_x^A * f_y^A) + \\ &(C_1^A * C_0^B) * (f_x^B * f_y^Y) + (C_1^A * C_1^B) * \text{spike}_2 \end{aligned} \quad (40)$$

In order for $F_2^{Composite}$ to be formally equal to a decomposed function, the sum of first three terms of the final expression need to be equal to the product of two filters, which will not be true generally. Therefore, to combine the two filters, the two-dimensional convolution needs to be approximated with a decomposed filter. One way to do this starts by creating one-dimensional filters which are equal to the horizontal and vertical sums of the composite filter $$f_x(x) = \sum_y F_2^{Composite}(x, y) \quad (41)$$

$$F_y(y) = \sum_x F_2^{Composite}(x, y) \quad (42)$$

Figure 13:
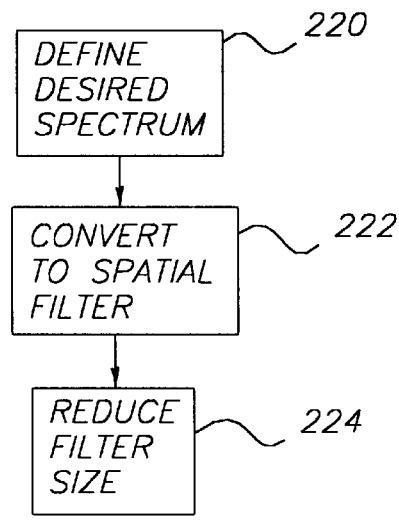
FIG. 13 illustrates a filter creation process.

The one-dimensional functions $f_x$ and $f_y$ have Fourier transforms which equal the transform of $F_2^{Composite}$ on the x and y axes. The final composite can then be computed by basing a decomposition on $f_x$ and $f_y$. The process described herein for adjusting the size of filters can also be used as a tool for creating filters. This is because it is easy to create a wide filter having a given spectrum. A method producing filters is depicted in FIG. 13. The first step is to define 220 a desired spectrum over a large grid of points. For the types of spectra which can be reasonably represented with practical filters a 64-point grid is appropriate. Next, the spectrum is converted 222 into a spatial filter by Fourier transforming it. Then, the size of the resulting spatial filter is reduced using the techniques described herein. Of course, not every spectrum can be reasonably represented by a small filtering kernel. The filter needs to not have many sharp transitions in its spectrum. There are ways of conditioning the initial data to make sure that it can be represented reasonably well. One approach is to convolve the initial spectrum with a smoothing filter whose width depends on the final desired filter size. Another technique is to multiply the initial spatial filter by a Gaussian or similar function. This suppresses side-lobes and has the effect of smoothing the spectrum.

In the case of resampling filters both techniques can be used. As described earlier herein, a set of resampling filters corresponds to a single composite filter. The spectrum of the interpolated picture is equal to the spectrum of the input picture times the spectrum of the composite. Thus, ideally the composite's spectrum should be 1 where the frequencies of the picture should be preserved and 0 where they should be suppressed. In addition, the composite itself cannot be aliased. The original picture has a cutoff frequency of $$\frac{1}{2\Delta x}, \tag{43}$$

where ax is the sample spacing; the scaled picture has a cutoff frequency of $$\frac{scaleFactor}{2\Delta x} \tag{44}$$

Thus, the cutoff frequency for the composite is:

$$\frac{\min(1, scaleFactor)}{2\Delta x} \tag{45}$$

The spectrum of the composite filter should be 1 below this frequency and 0 above it. Of course, no finite digital filter is going to follow this requirement exactly; for an actual filter the fall-off will be gradual and there will be overshoot and undershoot above and below the transition. It is preferable to come as close to the required shape as possible for a given number of filter points.

One method for creating a N-point resampling filter starts by creating the composite filter for a $N_0$-point filter. Preferably, $N_0$ is set to 64. The initial composite has $N_0$*nphase−1 points. The frequency corresponding to the i'th point, normalized to the picture sample rate is given by:

$$frequency(i) = \frac{i-1}{nphase} \tag{46}$$

Figure 14:
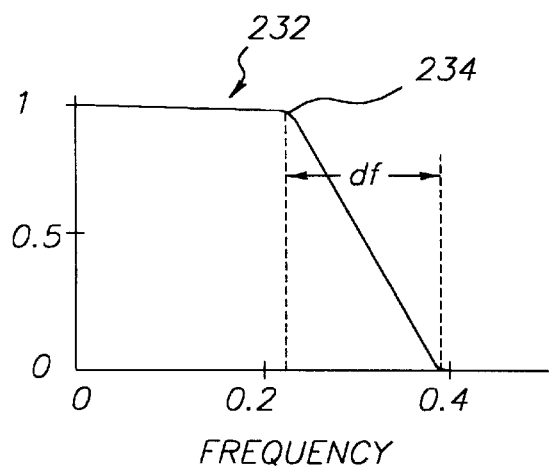
FIG. 14 depicts a trapezoid function used in filter design.

Because the composite is real and symmetric, its spectrum must also be real and symmetric. For the initial spectrum it is preferred to use a trapezoid function 232, as depicted in FIG. 14, having the desired cut-off frequency and a width which depends on the desired filter size. The initial width of the transition is related to the intended size by:

$$df = \min\left(\frac{1}{4}, \frac{1}{N-2}\right). \tag{47}$$

The location of the transition 234 of the function in FIG. 14 depends on the intended scale factor and on how much aliasing is tolerable or desired in the scaled output pictures. The initial estimate is smoothed out by taking a running three-point average, and then performing a Fourier transform. The resulting spatial filter is then multiplied by a conventional Gaussian smoothing function whose width is equal to df. This initial composite is reduced in size and then normalized as described herein.

As an example of using this method to generate a sharpening filter, consider the following method for computing an N-point sharpening filter from a small number of spectral values. The method starts by defining a $N_0$-point spectral filter where $N_0$ is an odd number much larger than N. It does this using the following steps:

1. Create new spectral values by flipping the specified values so that the set of sample points are symmetric and periodic over the normalized frequency interval −0.5 to 1.5.
2. Interpolate the values to create a symmetric $N_0$-point spectrum.
3. Perform a Fourier transform to get an initial $N_0$-point spatial filter The size of this initial filter can now be reduced to the desired width using the techniques described previously herein. As a final step a decomposition of the N-point filter can be created to get a final filter.

The present invention has been described with respect to using the invention for visual image filtering, however, the invention can also be used for audio and other types of filtering where digital filters are used. A ramp function has been used in a number of different instances in the computations described herein and a function such as a Gaussian function could instead be used. The basis vectors used for the size reduction could be other sets of functions that span the space of possible filters. The property vectors used in the size reduction could also be linear expressions of other filter properties which might be important for a given application.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Reference Number List

10 System
12 Scanner
14 Computer
16 Monitor
18 Printer
32–76 Process steps
90 Filter
92 Transformed filter
94 Scaled filter
102–116 Process steps
122 15 point transform
124 7 point transform
126 Adjusted filter
130–158 Process steps
164,166,168 Basis vectors
170 DC component
182 Measured values
184 Fourier transform
186 Fourier transform
188 Sharpening filter
190 Rescaled filter
192 7 point filter
194 21 point filter
196 Reduced filter
202 Attenuation function 220–224 Process steps
232 Trapezoid function
234 Transition

What is claimed is:

1. A method of adjusting a width of a digital filter, comprising:
   truncating the digital filter producing a truncated filter; and
   combining truncated filter with a set of basis vectors.

2. A method as recited in claim 1, further comprising attenuating endpoints of the truncated filter after the truncating.

3. A method as recited in claim 1, wherein said combining comprises determining a linear combination of the truncated filter and the basis vectors which minimizes property value changes.

4. A method of adjusting a width of a digital filter, comprising:
   truncating the digital filter producing a truncated filter;
   attenuating endpoints of the truncated filter;
   computing first property values for the digital filer;
   computing second property values for the truncated filter;
   determining a linear combination of the truncated filter and basis vectors which minimizes property value changes between the first and second property values;
   combining the truncated filter with the basis vectors producing an adjusted width filter; and
   adjusting a DC component of the adjusted width filter.

5. An apparatus, comprising:
   an input device inputting an input signal;
   an output device outputting an output signal and having an output filter; and
   a computer coupled between said input and output devices and applying a user selected filter to the input signal to produce a signal image where the selected filter is produced by combining the selected filter with the output filter producing a combined filter and where a width of the combined filter is adjusted by truncating the combined filter producing a truncated filter and combining the truncated filter with a set of basis vectors.

6. An apparatus as recited in claim 5, wherein the input signal comprises a visual image.

7. A method of creating a filter, comprising:
   defining a spectrum of the filter;
   performing a Fourier transform on the filter spectrum creating a spatial filter; and
   reducing a size of the spatial filter by truncating the spatial filter producing a truncated filter and combining the truncated filter with a set of basis vectors.

8. A method as recited in claim 7, further comprising smoothing the filter after the defining.

9. A method as recited in claim 7, wherein said defining comprises setting spectral values of the desired filter and interpolating between the spectral values to create a spectrum with N points where N equals sixty-four.

10. An apparatus, comprising:
    an input device allowing a user to define a spectrum of a desired digital filter; and
    a computer coupled to the input device, performing a Fourier transform on the filter spectrum creating a spatial filter, and reducing a size of the spatial filter by truncating the spatial filter producing a truncated filter and combining the truncated filter with a set of basis vectors.

11. A method of adjusting a width of digital sharpening kernels of a digital filter, comprising:
    truncating the filter;
    determining a set of basis filters having a same width as the truncated filter;
    determining a set of property vectors which represent important visual properties of the digital filter;
    determining a set of mixing coefficients from the properties of the digital filter, the truncated filter, and the basis filters ; and
    using the mixing coefficients to combine the truncated filter with a set of basis vectors.

12. A method as recited in claim 11, wherein the digital filter is truncated in steps of two points reducing the digital filter width.

13. A method as recited in claim 12, further comprising attenuating the endpoints of the truncated filter after truncating the digital filter.

14. A method of scaling a digital sharpening kernel where a scaling factor is greater than 1, comprising:
    computing a high-frequency component of the sharpening kernel;
    removing the high frequency component from the sharpening kernel;
    resampling the sharpening kernel with the high frequency component removed using a digital resampling filter;
    computing the high-frequency component of the resampled filter; and
    restoring the original high-frequency component of the sharpening kernel.

15. A computer program product comprising a computer readable storage medium having a process truncating a digital filter producing a truncated filter and combining the truncated filter with a set of basis vectors.

16. A computer program product comprising a computer readable storage medium having a process defining a spectrum of a filter, performing a Fourier transform on the filter spectrum creating a spatial filter, and reducing a size of the spatial filter by truncating the spatial filter producing a truncated filter and combining the truncated filter with a set of basis vectors.

* * * * *

UNITED STATES PATENT AND TRADEMARK OFFICE
CERTIFICATE OF CORRECTION

PATENT NO.    : 6,167,414  
DATED         : December 26, 2000  
INVENTOR(S)   : Michael S. Schwartz Page 1 of 1

It is certified that error appears in the above-identified patent and that said Letters Patent is hereby corrected as shown below:

Equation 12, column 8,  
Delete the existing equation and insert the equation therefore:

$$A_{b,b'} = \begin{cases} \sum_p \left( \dfrac{weight_p}{\Delta + old\,Property_p^2} * M_{b,p} * M_{b',p} \right) & \text{for } b \neq b' \\ \sum_p \left( \dfrac{weight_p}{\Delta + old\,Property_p^2} * M_{b,p} * M_{b',p} \right) & \text{for } b = b' \end{cases}$$

$$Y_b = \sum_p \left( \dfrac{weight_p}{\Delta + old\,Property_p^2} * M_{b,p} * (old\,Property_p - adjusted\,Property) \right)$$

Signed and Sealed this

Thirtieth Day of October, 2001

*Attest:*

*Attesting Officer*

NICHOLAS P. GODICI  
*Acting Director of the United States Patent and Trademark Office*